C. T. KADOW.
COLLET CHUCK.
APPLICATION FILED MAR. 13, 1911.
1,007,786.
Patented Nov. 7, 1911.
3 SHEETS—SHEET 2.
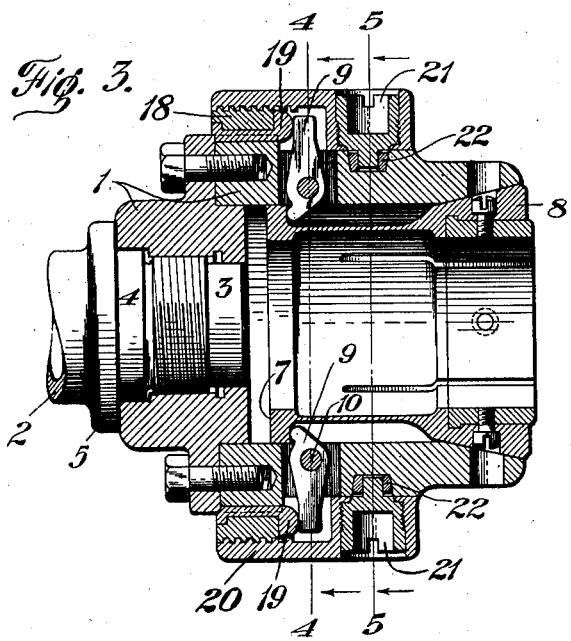
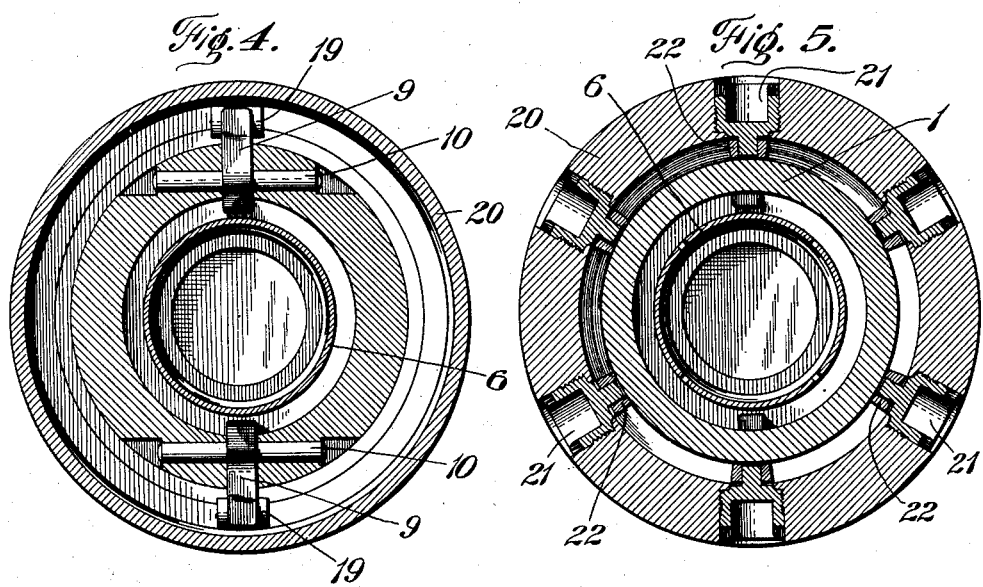
Inventor
CHARLES T. KADOW.
Witnesses
By 
Attorneys

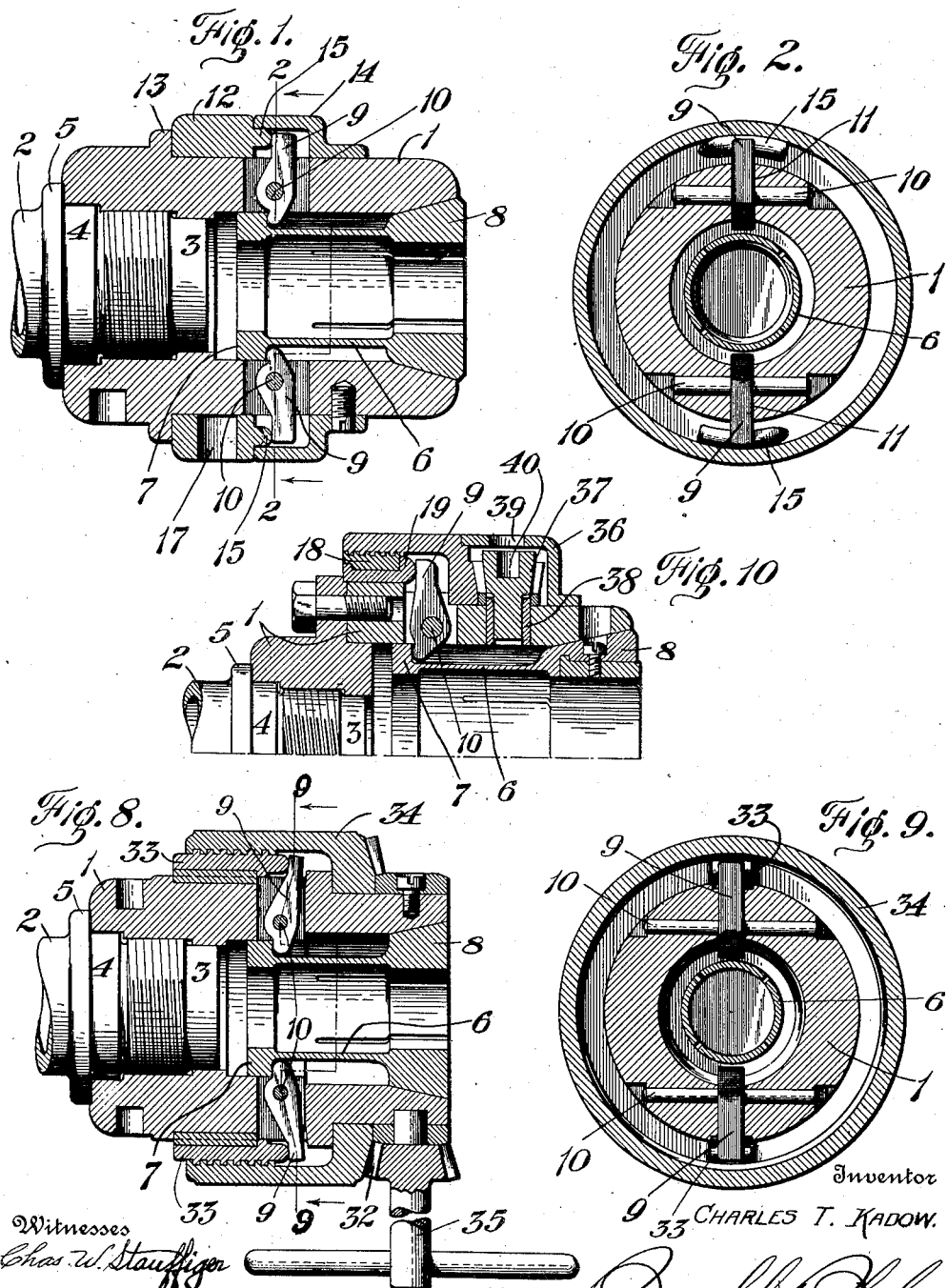

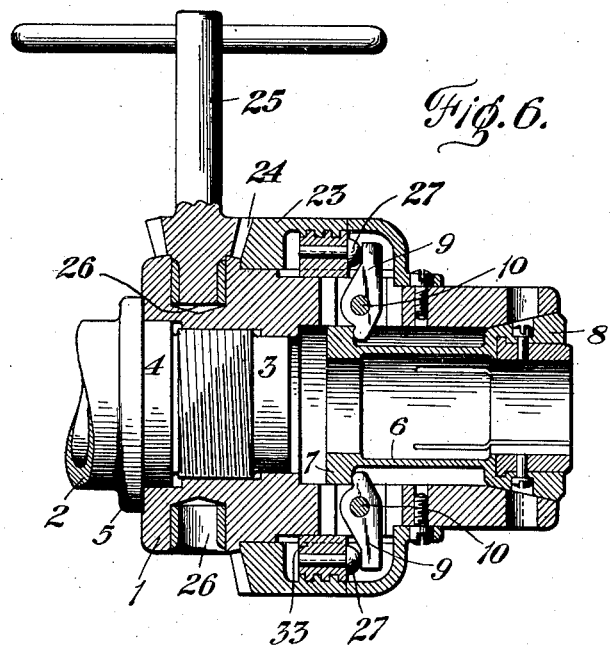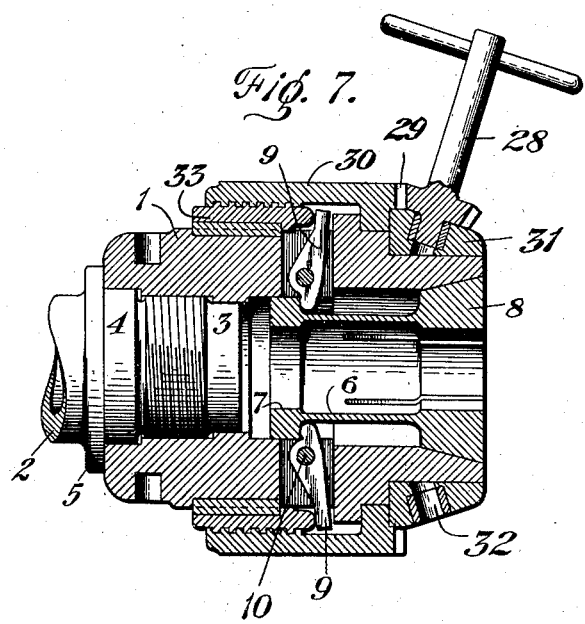

UNITED STATES PATENT OFFICE.

CHARLES T. KADOW, OF DETROIT, MICHIGAN.

COLLET-CHUCK.

1,007,786.  Specification of Letters Patent.  Patented Nov. 7, 1911.

Application filed March 13, 1911. Serial No. 614,006.

*To all whom it may concern:*

Be it known that I, CHARLES T. KADOW, a citizen of the United States of America, residing at Detroit, in the county of Wayne and State of Michigan, have invented certain new and useful Improvements in Collet-Chucks, of which the following is a specification, reference being had therein to the accompanying drawings.

In the use of chucks or collet attachments for the hollow spindles of standard lathes or with so called collet machines, it is desirable that the work to be operated upon be supported and centered as close to the outer end of the spindle or collet as possible and that the holder engage the work through as great a portion of the circumference of the latter as possible. It is also necessary for rapid operation that the chuck or holder accurately center the stop without special attention on the part of the operator, and that it be manipulated from the end of the spindle adjacent the tool and not from the outer or rear end as is usual in collet machines.

This invention relates to collet chucks and especially to an arrangement thereof which accurately centers the work or stock and supports it close to the end of the spindle and which admits of the adjusting of the collet at the inner end of the spindle to which it may be attached.

The invention consists in the matters hereinafter set forth, and more particularly pointed out in the appended claims.

In the drawings, Figure 1 is a view in longitudinal section of one form of collet chuck that embodies features of the invention; Fig. 2 is a view in section on line 2—2 of Fig. 1; Fig. 3 is a view in longitudinal section of the chuck showing a modification of the operative mechanism; Fig. 4 is a view in section on line 4—4 of Fig. 3; Fig. 5 is a view in section on line 5—5 of Fig. 3; Fig. 6 is a view in longitudinal section of a chuck with tightening means at the inner end of the chuck; Fig. 7 is a view in longitudinal section of a chuck with tightening wrench applied to the outer end; Fig. 8 is a view in longitudinal section showing another arrangement of the chuck; Fig. 9 is a view in section on line 9—9 of Fig. 8, and Fig. 10 is a partial view in detail showing a shield over the tightening means.

Referring to the drawings, a hollow casing 1 or collet is counter-bored and interiorly threaded for attachment to the outer end of a collet or live spindle 2, of a standard lathe, for example, the latter preferably having a reduced end 3 and an inner bearing portion 4 whereby the casing is drawn truly onto the live spindle against a flange 5. A sleeve 6 has an inner enlarged or flanged end 7 reciprocable in the outer bore of the casing and an outer split end 8 that is formed to fit the outer interiorly tapered portion of the casing bore so that inward movement of the sleeve contracts the split end, the taper of the bore being such that the tendency of the contracted end to expand returns the sleeve to its original position.

Two or more radially disposed fingers 9 are pivoted on suitable pins 10 or the like in slots 11 of the casing with their inner ends bearing against the outer face of the flange 7 of the sleeve 6 and their outer arm portions engaging a collar 12 rotatable on the casing between a shoulder 13 and a removable stop ring 14 which shields or incloses the fingers 9. Cam projections 15 either integrally formed or otherwise secured on the face of the collar underride and oscillate the fingers simultaneously when the collar is turned on the casing. This rotation may be accomplished in the smaller sizes of the chuck by the insertion of a spanner wrench in a socket 17 in the collar itself, as indicated in Fig. 1, or other provision may be made for rotating it.

Instead of oscillating the fingers by cams on the collar, the latter may be reciprocable longitudinally on the casing. In Figs. 3, 4 and 5, the collar 18 is held from rotation by splines or keys 19 whose enlarged inner ends form bearings on which the fingers bear, and is shifted longitudinally by turning an exterior rotatable member 20 that is in screw-threaded engagement with the collar and is provided with a plurality of socket bushings 21 for application of a spanner wrench. Friction rollers or rings 22 on the inner ends of the bushings engage a peripheral groove in the casing, and hold the member 20 in place. In Fig. 6 an outer member 23 in screwthreaded engagement with the collar has a bevel gear 24 formed on or secured to its face adjacent the live spindle 2. A pinion wrench 25 may, by insertion in suitable sockets 26, be turned into mesh with the gear 24 to rotate the latter. As a further detail, hardened bearing pins 27 may be inserted for the fingers to ride on. If desired, the wrench may be applied to the other end of the member, and such a construction is shown in Fig. 7, with a pinion wrench 28 meshing with spur gear teeth 29 on the face of the rotatable member 30 remote from the live spindle, the outer periphery of a stop ring 31 on the casing end in which wrench sockets 32 are placed being slightly tapered to give ready access to work in the chuck.

In Figs. 8 and 9, a further variation is shown wherein a collar 33 is reciprocated by an interiorly screwthreaded annulus 34 which may be turned on the casing 1, if desired, by a pinion wrench 35 meshing with taper gear teeth 32 formed on the outer end of the annulus, the taper insuring a close fit. A shield 36 (shown in Fig. 10) may be used to cover the gear teeth in which case a pinion 37 is mounted in mesh therewith in a suitable bearing bushing 38 in the casing, a squared or polygonal wrench bar being inserted through an opening 39 in the shield into a squared or polygonal recess 40 in the pinion to turn the latter. One result of this construction is the fact that the sleeve grips the work through a major portion of its circumference close to the collet or live spindle end so that there is no chattering or vibration. Furthermore any wear on the beveled face of the casing is compensated for by setting up the collar that throws the fingers. As the jaws of the sleeve are integral with the sleeve and depend entirely upon the beveled face of the casing for centering, they are always moved uniformly and therefore accurately hold turned stock in place. As there are no serrations or projections on the jaws they do not enter the face of the work and therefore do not mar it, neither is there any possibility of the work being thrown out of center, as is the case if the jaws are free to indent the surface, in which case improper centering results if one jaw enters the work farther than another. As shown in the larger sizes, the chuck may have an opening (as indicated in Fig. 10) free to receive work of greater diameter than the bore of the collet or live spindle so that larger work may be readily tooled without the use of a face plate chuck.

Obviously, changes in the details of construction may be made without departing from the spirit of the invention and I do not care to limit myself to any particular form or arrangement of parts, except as set forth in the appended claims.

What I claim as my invention:—

1. A collet chuck comprising a cylindrical casing adapted at its inner end for screwthreaded engagement with the end of a live spindle and provided at its outer end with a tapered bore, a sleeve having a flange on its inner end reciprocable in the cylindrical portion of the casing bore and a split outer end in sliding engagement with the tapered portion of the casing bore, pivot pins transverse to the axis of the casing passing through peripheral slots therein, radially disposed fingers pivoted on the pins in the slots with their inner ends bearing against the outer face of the inner sleeve flange and their outer ends projecting beyond the periphery of the casing, a collar on the casing adapted when shifted to oscillate the arms, and a member rotatable on the casing adapted to engage and move the collar.

2. A collet chuck comprising a cylindrical casing adapted at its inner end for screwthreaded centered engagement with the end of a live spindle and provided at its outer end with a tapered bore, a sleeve having a flange on its inner end reciprocable in the cylindrical portion of the casing bore and a split outer end in sliding engagement with the tapered portion of the casing bore, pivot pins transverse to the axis of the casing passing through peripheral slots therein, radially disposed fingers pivoted on the pins in the slots with their inner ends bearing against the outer face of the inner sleeve flange and their outer ends projecting beyond the periphery of the casing, a collar on the casing adapted when shifted to oscillate the arms, a member rotatable on the casing adapted to engage and move the collar, gear teeth on an end of the member, and a pinion wrench adapted when inserted in a socket in the casing to mesh with the gear teeth.

3. A collet chuck comprising a cylindrical casing whose inner end is fitted to engage the screw threads and adjacent portions of a live spindle and whose outer end is interiorly taper bored, a sleeve reciprocable in the casing having a flange on its inner end fitting the cylindrical bore of the casing and a split outer end engaging the taper bore of the casing, fingers pivoted transversely to the casing axis in peripheral slots in the casing with their inner ends bearing against the outer annular face of the end flange of the sleeve and with their outer ends extending beyond the periphery of the casing, a collar movable on the casing between the end thereof and the projecting portions of the fingers, bearing members on the collar contacting with the projecting portions of the fingers and an annular member rotatable and non-reciprocable on the casing adapted to shift the collar when rotated.

4. A collet chuck comprising a cylindrical casing whose inner end is fitted to engage the screw threads and adjacent portions of a live spindle and whose outer end is interiorly taper bored, a sleeve reciprocable in the casing having a flange on its inner end fitting the cylindrical bore of the casing and a split outer end engaging the taper bore of the casing, fingers pivoted transversely to the casing axis in peripheral slots in the casing with their inner ends bearing against the outer annular face of the end flange of the sleeve and with their outer ends extending beyond the periphery of the casing, a collar movable on the casing between the outer end thereof and the projecting portions of the fingers, bearing members on the collar contacting with the projecting portion of the fingers and an annular member rotatable and non-reciprocable on the casing in screw-threaded engagement with the collar.

5. A collet chuck comprising a substantially cylindrical casing whose inner end is counterbored and screw-threaded for centered engagement with a live spindle and whose cylindrical bore is tapered at the outer end of the casing, a sleeve of smaller diameter than the cylindrical bore provided with a flange on its inner end fitting the cylindrical bore and with a split enlarged outer end fitting the tapered portion of the bore, fingers pivoted in the casing transversely to the diameter thereof in peripheral slots, with the inner ends bearing against the outer annular face of the flange of the sleeve and with the outer ends projecting beyond the periphery of the casing, a collar movable on the casing adjacent the fingers with which its outer annular face is in contact, an annular member rotatable on the casing in screwthreaded engagement with the collar, forming a shield for the fingers, and means for rotating the member.

In testimony whereof I affix my signature in presence of two witnesses.

CHARLES T. KADOW.

Witnesses:
C. R. STICKNEY,
A. M. SHANNON.